Sept. 9, 1958 R. WOODCOCK ET AL 2,851,676

DRIVING APPARATUS FOR RECORDING TAPES

Filed Feb. 27, 1957

INVENTORS
RAYMOND WOODCOCK
JAMES H. W. TAYLOR
JOHN CECIL GLADMAN

By Miles S. Pillard [signature]
THEIR ATTORNEY

United States Patent Office 2,851,676

Patented Sept. 9, 1958

2,851,676

DRIVING APPARATUS FOR RECORDING TAPES

Raymond Woodcock, Sale, James Hargreaves Woodcock Taylor, Rossendale, and John Cecil Gladman, Manchester, England, assignors to Metropolitan-Vickers Electrical Company Limited, London, England, a British company Application February 27, 1957, Serial No. 642,868

Claims priority, application Great Britain March 1, 1956

6 Claims. (Cl. 340—174)

This invention relates to driving apparatus for recording tapes and especially to driving apparatus for moving the tape past pick-up apparatus for reading the information on the tape.

The invention has an important application in computing apparatus in which information is recorded on the tape in code form such as in binary notation. In such cases the drive must be synchronised with the control of the pick-up apparatus to ensure the correct information is read off the tape.

Tape driving mechanism hitherto has usually fallen into two general classes; the first class of mechanism employs a sprocket wheel drive which engages with holes in the tape aligned with information holes. Such an arrangement ensures that the information holes correctly register each time a reading occurs but has the disadvantage that the speed at which the mechanism can be operated without risk of tearing the tape is limited due to the fact that the sprocket wheel drive acts on a small area of the tape.

An alternative drive which has been employed is the friction drive. This does not have the inherent disadvantage of the sprocket drive as regards risk of tearing the tape, but it does have a liability to slip and hence it is necessary to provide auxiliary means of registration such for example, as photo-electric cells actuated by light shining through holes in the tape.

A further disadvantage which occurs with both the above arrangements is that the tape drive is permanently in contact with the tape which means that if the tape motion is stopped each time a reading is taken, as is desirable, both the tape and the drive have to be alternately accelerated and decelerated and as in many cases the inertia of the drive is very much greater than that of the tape it is the drive which limits the rate of acceleration and deceleration and hence the rate at which the tape can be moved.

The main object of the invention is to provide an improved arrangement which avoids some of the above disadvantages.

According to the present invention apparatus for driving a recording tape comprises a rocker member, a driving roller pivoted on one arm of said rocker member and a brake block attached to another arm of said member, together with means for oscillating said rocker member about a fixed axis so that the driving roller and the brake block alternately are moved into operative engagement with the tape to produce a step-by-step movement and tape reading means actuated to read the information at reading positions on the tape.

According to a preferred arrangement the rocker carries an idler roller which presses the tape against a continuously rotating driven roller each time it is actuated and similarly the rocker also carries a brake block which clamps the tape against a co-operating brake member such as a bar.

According to another preferred arrangement the reading apparatus is actuated by an idler sprocket wheel the teeth of which engage holes in the tape on one side and on the other side pass a gap in a magnetic circuit so as to generate a pulse which actuates the tape reading mechanism.

In order that the invention may be more clearly understood reference will now be made to the accompanying drawings in which.

Figures 1, 2:
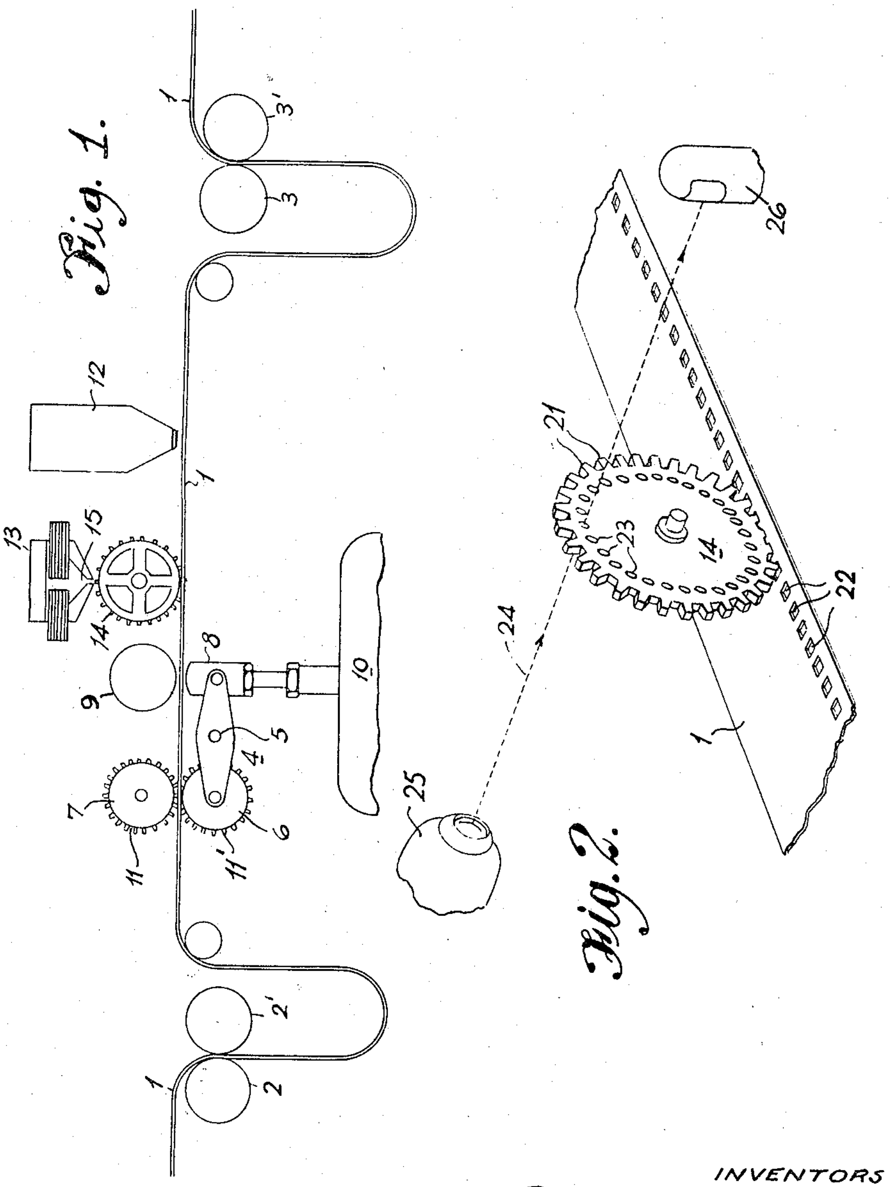
Figure 1 shows diagrammatically apparatus embodying the invention.
Figure 2 shows diagrammatically apparatus embodying an alternative form of the invention.

In the drawing the reference 1 indicates the tape. Driving rollers 2, 2' and 3, 3' are arranged to produce loops at each end of the tape reading apparatus. 4 is the rocker pivoted at 5 and at its left end carrying a friction roller 6 which co-operates with a driven friction roller 7. At the right end of the rocker is a brake block 8 which co-operates with a brake bar 9. 10 represents actuating mechanism which oscillates the rocker 4 so that the friction roller 6 and the brake block 8 are moved upwardly alternately into engagement with the tape. When the friction roller 6 is moved upwardly it clamps the tape against the driven roller 7 so that it is moved forward a step. The rollers 6 and 7 are geared together by teeth 11 and 11' so that both rollers rotate continuously, it being appreciated that as the vertical movement is quite small the teeth remain permanently engaged. When, on the alternate movement of the rocker, the brake block 8 is moved upwardly it clamps the tape against the brake bar 9 and arrests its movement. As each reading position passes the reading head 12 a reading is made. The reading head 12 is actuated by a magnetic head 13 which co-operates with an idler wheel 14. The wheel 14 is a very light wheel carrying around its periphery small iron pegs which locate in register holes in the tape, each time one of these pegs passes the magnetic gap 15 it produces an electrical pulse which actuates the reading apparatus 12 to read the information on the tape.

It will be appreciated that, with such an arrangement, the movement of the rollers and brake is only of the order of 2 to 3 thousandths of an inch and very high operation speed is hence possible. At the same time the reading apparatus 12 remains accurately in register with the information on the tape as it is controlled by the idler wheel 14 which does not drive the tape.

In the above arrangement the pulses are generated by pegs on the idler wheel 14 passing the magnetic gap 15.

According to an alternative arrangement holes or slots could be cut in the periphery of the idler wheel or in a flange or wheel secured thereto and the pulses are triggered by light passing through these holes or slots on to a photo cell. There would, of course, be a hole or slot corresponding to each tooth and appropriately positioned, e. g. diametrically opposite, so that the pulses are correctly timed and can be used to control the tape drive in the manner above described.

An embodiment of this alternative arrangement is shown diagrammatically in Fig. 2, in which the teeth 21 of the idler wheel 14 engage with holes 22 on the tape 1. The holes 23 in the wheel are in one to one correspondence with the teeth. A beam of light 24 from a source 25 is directed to pass through the hole corresponding with the tooth engaged in the tape. The beam of light is received by a photo cell 26. As the wheel 14 rotates the beam of light is repeatedly interrupted by the opaque portions of the wheel. Electrical pulses may be derived from the photo cell by any known means and applied to the reading mechanism so as to actuate it only when the wheel is stationary.

What we claim is:

1. Apparatus for driving a recording tape comprising a rocker member having a plurality of arms, a driving roller pivoted on one of said arms, a brake block attached to another of said arms, means for oscillating said rocker member about a fixed axis so as to cause said driving roller and said brake block to move alternately into operative engagement with the tape to produce a step-by-step movement of the tape, and tape reading means actuated to read information on the tape when the tape is stationary.

2. Apparatus for driving a recording tape comprising a recording tape with reading positions for carrying information thereon, a rocker member having a plurality of arms, a driving roller pivoted on one of said arms, a brake block attached to another of said arms, means for oscillating said rocker member about a fixed axis so as to cause said driving roller and said brake block to move alternately into operative engagement with the tape to produce driving and braking positions, means for rotating said roller continuously so that it drives the tape a distance equal to the distance between successive reading positions when the rocker member is in the driving position, a brake co-operating member against which the tape is forced by said brake block when the rocker member is in the braking position so as to produce a step-by-step movement of the tape, and tape reading means actuated to read information at reading positions on the tape when the tape is stationary.

3. Apparatus for driving a recording tape comprising a rocker member having a plurality of arms, a driving roller pivoted on one of said arms, a brake block attached to another of said arms, means for oscillating said rocker member about a fixed axis so as to cause said driving roller and said brake block to move alternately into operative engagement with the tape to produce a step-by-step movement of the tape, an idler wheel with a plurality of teeth for engaging the tape so that said idler wheel rotates simultaneously with the tape movement, a magnetic circuit including a magnetic gap, means for obtaining electrical pulses corresponding with a movement of each tooth of said idler wheel past said magnetic gap, a tape reading means, and means for causing said pulses to operate said tape reading means to read information on the tape when it is stationary.

4. Apparatus for driving a recording tape comprising a rocker member having a plurality of arms, a driving roller pivoted on one of said arms, a brake block attached to another of said arms, means for oscillating said rocker member about a fixed axis so as to cause said driving roller and said brake block to move alternately into operative engagement with the tape to produce a step-by-step movement of the tape, an idler wheel with a plurality of teeth for engaging the tape so that said idler wheel rotates simultaneously with tape movement, said idler wheel having a plurality of holes in the periphery thereof in one-to-one correspondence with said teeth, a photo cell, a light source for directing a beam of light to pass through said holes in said idler wheel and on to said cell such that the beam is repeatedly interrupted by the rotation of the wheel, a tape reading means, and means for causing electrical pulses thereby obtained from said photocell to operate said tape reading means for reading information on tape when it is stationary.

5. Apparatus for driving a recording tape comprising a recording tape with reading positions for carrying information thereon, a rocker member having two arms, a driving roller pivoted on one of said arms, a brake block attached to the other of said arms, means for oscillating said rocker member about a fixed axis so as to cause said driving roller and said brake block to move alternately into operative engagement with the tape to produce driving and braking positions, means for rotating said roller continuously so that it drives the tape a distance equal to the distance between successive reading positions when said rocker member is in the driving position, a brake co-operating member against which the tape is forced by said brake block when said rocker member is in the braking position so as to produce a step-by-step movement of tape corresponding with successive reading positions, an idler wheel with a plurality of teeth for engaging the tape so that said idler wheel rotates simultaneously with the movement of the tape, a magnetic circuit including a magnetic gap, means for obtaining electrical pulses corresponding with a movement of each tooth of said idler wheel past said magnetic gap and means for causing said pulses to operate said tape reading means to read information on tape when it is stationary.

6. Apparatus for driving a recording tape comprising a recording tape with reading positions for carrying information thereon, a rocker member having two arms, a driving roller pivoted on one of said arms, a brake block attached to the other of said arms, means for oscillating said rocker member about a fixed axis so as to cause said driving roller and said brake block to move alternately into operative engagement with the tape to produce driving and braking positions, means for rotating said roller continuously so that it drives the tape a distance equal to the distance between successive reading positions when said rocker member is in the driving position, a brake co-operating member against which the tape is forced by said brake block when said rocker member is in the braking position so as to produce a step-by step movement of the tape, an idler wheel with a plurality of teeth for engaging the tape so that said idler wheel rotates simultaneously with movement of the tape, said idler wheel having a plurality of holes adjacent to the periphery thereof in one-to-one correspondence with said teeth, a photo cell, a light source for directing a beam of light to pass through said holes in said idler wheel when and on to said cell such that the beam is repeatedly interrupted by the rotation of the wheel, a tape reading means, and means for causing electrical pulses thereby obtained from said photocell to operate said tape reading means to read information on the tape when it is stationary.

No references cited.